United States Patent
Poddey

(10) Patent No.: US 11,875,345 B2
(45) Date of Patent: Jan. 16, 2024

(54) METHOD AND DEVICE FOR CONDUCTING A TRANSACTION BETWEEN A PLURALITY OF PARTITIONS OF A BLOCKCHAIN

(71) Applicant: Robert Bosch GmbH, Stuttgart (DE)

(72) Inventor: Alexander Poddey, Wiernsheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 79 days.

(21) Appl. No.: 17/448,779

(22) Filed: Sep. 24, 2021

(65) Prior Publication Data

US 2022/0122067 A1    Apr. 21, 2022

(30) Foreign Application Priority Data

Oct. 20, 2020   (DE) .................. 102020213240.2

(51) Int. Cl.
G06Q 20/38    (2012.01)
(52) U.S. Cl.
CPC ... G06Q 20/38215 (2013.01); G06Q 20/3825 (2013.01); G06Q 20/3827 (2013.01)
(58) Field of Classification Search
CPC ......... G06Q 20/38215; G06Q 20/3825; G06Q 20/3827; G06Q 20/0655; G06Q 20/3678; G06Q 20/381; G06Q 20/389; G06Q 40/04; G06F 16/27; G06F 21/64
See application file for complete search history.

(56) References Cited

U.S. PATENT DOCUMENTS

| | | | | |
|---|---|---|---|---|
| 2020/0313887 A1* | 10/2020 | Yin | ...................... | G06Q 20/389 |
| 2021/0064584 A1* | 3/2021 | Assadipour | ........... | H04L 9/3247 |
| 2021/0092185 A1* | 3/2021 | Derosa-Grund | ...... | H04L 9/3297 |
| 2021/0273993 A1* | 9/2021 | Shirley | .................... | H04L 67/10 |
| 2021/0336768 A1* | 10/2021 | Davis | .................... | H04L 9/3236 |
| 2022/0058625 A1* | 2/2022 | Yantis | .................... | G06Q 20/40 |
| 2022/0374875 A1* | 11/2022 | Madisetti | ............ | G06Q 20/389 |

FOREIGN PATENT DOCUMENTS

| | | | |
|---|---|---|---|
| DE | 102018210224 A1 | 12/2019 | |
| WO | WO-2018006945 A1 * | 1/2018 | ........... B64G 1/1021 |

OTHER PUBLICATIONS

Dziembowski et al., Counterfactual: General State Channel Networks, published Oct. 15, 2018 (Year: 2018).*
PPIO, Cross-Chains: How Blockchains Communicate With Each Other, published Oct. 12, 2019 (Year: 2019).*
Coleman et al., "Counterfactual: Generalized State Channels," 2018, pp. 1-48. <https://14.ventures/papers/statechannels.pdf> Downloaded Sep. 23, 2021.
Luu et al., "A Secure Sharding Protocol for Open Blockchains," CCS '16: Proceedings of The 2016 ACM SIGSAC Conference on Computer and Communications Security, 2016, pp. 1-13. <https://loiluu.com/papers/elastico.pdf> Downloaded Sep. 23, 2021.

* cited by examiner

*Primary Examiner* — Patrick McAtee
*Assistant Examiner* — Vincent I Idiake
(74) *Attorney, Agent, or Firm* — NORTON ROSE FULBRIGHT US LLP

(57) ABSTRACT

A method for conducting a transaction between a plurality of partitions of a blockchain. In the method: on the partitions, smart contracts are provided, through the contracts, state channels are anchored in the partitions, and the transaction between the partitions Ls carried out on the state channels.

7 Claims, 1 Drawing Sheet

METHOD AND DEVICE FOR CONDUCTING A TRANSACTION BETWEEN A PLURALITY OF PARTITIONS OF A BLOCKCHAIN

CROSS REFERENCE

The present application claims the benefit under 35 U.S.C. § 119 of German Patent Application No. DE 102020213240.2 filed on Oct. 20, 2020, which is expressly incorporated herein by reference in its entirety.

FIELD

The present invention relates to a method for conducting a transaction between a plurality of partitions of a blockchain. The present invention further relates to a corresponding device, a corresponding computer program, and a corresponding storage medium.

BACKGROUND INFORMATION

The terms "decentralized transaction system," "transaction database," or "distributed ledger" designate any protocol in computer networks that brings about a consensus regarding the sequence of particular transactions. A frequently seen realization of such a system is based on a blockchain, and forms the foundation of numerous so-called cryptocurrencies.

The consensus method most frequently used in the related art provides a proof of work (PoW) for the production of new valid blocks. In order to counteract excessive energy consumption in the production of such proofs, and to counteract unnecessary growth of the blockchain, so-called transaction or state channels are proposed and generalized, which connect individual subscribers off the blockchain (off chain), despite being anchored therein. An overview of this technology can be found in COLEMAN, Jeff; HORNE, Liam; XUANJI, Li. "Counterfactual: Generalized state channels" (2018).

German Patent Application No. DE 102018210224 A1 described, in the specific embodiment of claim 6, the following method for agreeing on a cooperation between two systems: the first system sends its assumptions regarding the second system, and its guarantees made thereto; conversely, the second system sends its assumptions regarding the first system and granted guarantees. A transaction database receives these mutual assumptions and guarantees, checks whether they correspond to one another, establishes, if warranted, a digital safety contract to be concluded between the systems, and finally documents this by adding a corresponding block to a blockchain. It then sends the block, with the safety contract, to both systems, which incorporate the cooperation as soon as they receive the block. For this purpose, these systems establish a mutual transaction channel on which they exchange information and signed messages, after reception of the block. If one of the systems receives an item of information that infringes the safety contract, it requests arbitration from the transaction database. The transaction database notifies the other system of this, requests the information (that allegedly infringes the safety contract) therefrom, and checks this information based on the contract.

Such smart contracts embody the legal logic of any distributed application (dApp) of a transaction database. German Patent Application No. DE 102018210224 A1 for example describes a smart contract for preparing and/or carrying out transactions between a holder of an end device and a service provider, the smart contract containing conditions of the service provider for services of an information service provider, in particular conditions relating to usage fees, preferably a roadway usage fee, and/or for services of a service provider, in particular conditions relating to surrender fees, preferably parking fees, fueling fees, fees of a charging station for the end device, and/or conditions of guarantee and/or conditions relating to usage fees, preferably fees for a common use of the end device for provision and/or termination of a service, and/or conditions defined by the holder for this end device for assumption and/or termination of the service, the smart contract being carried out in a authorization node of a computer network based on a blockchain.

The horizontal fragmentation (sharding) standardly used for denormalization in database applications can be used to partition rapidly growing blockchains into independent partitions (shards). This approach is explained in LUU, Loi, et al., "A secure sharding protocol for open blockchains," in: *Proceedings of the 2016 ACM Sigsac Conference on Computer and Communications Security* (2016), pp. 17-30.

SUMMARY

The present invention provides a method for conducting a transaction between a plurality of such partitions of a blockchain, a corresponding device, a corresponding computer program, and a corresponding machine-readable storage medium.

An example embodiment of the present invention is based on regarding shards as chains running in parallel, with the possibility of performing interactions between the chains, i.e., between shards (cross-shard), in a holistically secured manner.

Transactions on independent shards can be parallelized unproblematically, and the number of shards can be adapted to the runtime.

However, transactions that involve more than one shard, e.g., the transmission of a state value from one shard to another shard, require a coordinated execution on all the shards involved; for example, the transmission of a value stored on a shard, divided into two amounts, to two target addresses on two different shards would require a transaction with three shards.

These transactions with a plurality of shards reduce efficiency and throughput of the system, and increase its costs, due to the mining required on different shards.

Therefore, in general, the costs incurred by the user are also assessed such that these disadvantageous effects of transactions with a plurality of shards are reflected in the price; i.e., the price increases with the number of shards involved.

The method in accordance with an example embodiment of the present invention counteracts these increased costs associated with transactions between shards through an application of trust-free channel structures to shards. Through an anchoring according to the present invention of smart contracts in the relevant shards, such transactions can be carried out efficiently, but safely, off the blockchain, without the requirement of a trust basis between the involved parties.

Through the measures described herein, advantageous developments and improvements of the basic features of the present invention are possible.

BRIEF DESCRIPTION OF THE DRAWINGS

Exemplary embodiments off the present invention are shown in the figures and are explained in more detail in the following description.

DETAILED DESCRIPTION OF EXAMPLE EMBODIMENTS

Figure 1:
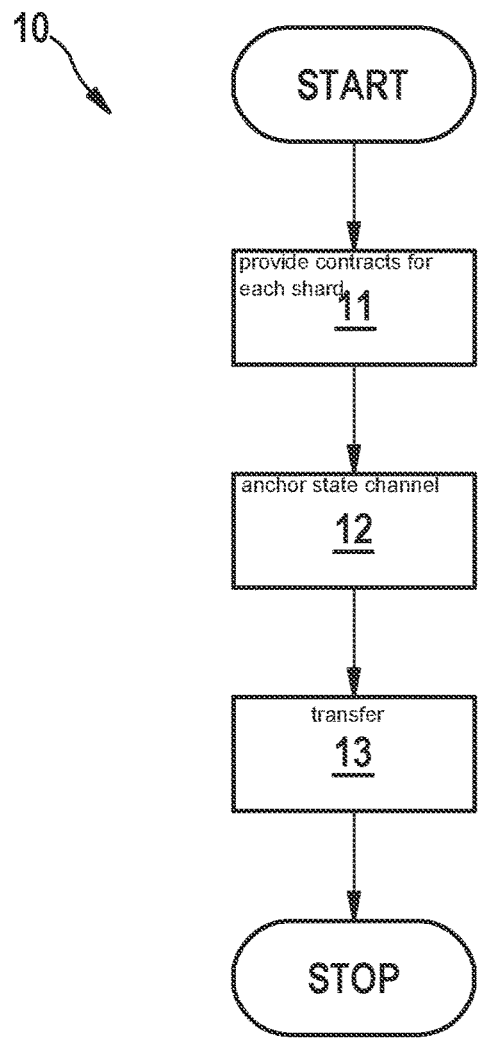
FIG. 1 shows the flow diagram of a method according to a first specific example embodiment of the present invention.

FIG. 1 illustrates the basic sequence of a method (10) according to the present invention for conducting a transaction between a plurality of partitions, or shards, of a blockchain. This design is to be illustrated on the basis of a simple example that can easily be generalized.

For this purpose, a decentralized transaction system is assumed having users $U_1$ through $U_N$, active on N different shards, i.e., having addresses and assets assigned thereto on a respective one of the shards. Further assumed is that $U_i$ wishes to transmit a state value to another user $U_j$, thus involving a cross-shard transaction.

We now make use of the insight that, as is standard in trust-free channels, channel networks, network nodes, etc., transactions in the chain (on chain) can be avoided through the use of a plurality of auxiliary contracts that enable a secure anchoring of the transactions carried out outside the chain, for example while making accessible owner and decision functions of the chain.

In a first approach, these contracts are provided for each shard (process 11).

This presupposes an intermediary, Ingrid, active on two or more shards, in particular on all the shards. This intermediary can anchor a state channel to $U_i$ in shard i and to $U_j$ in shard j (process 12). Applying the standard state channel approaches, a transfer from $U_i$ to $U_j$ via Ingrid can now be carried out through a cooperation of the three involved parties off the chain (process 13), as long as no dispute resolution is required.

Summarizing, $U_i$ communicates the value to Ingrid on shard i under the condition that Ingrid will transmit the same amount to $U_j$ on shard j. This can be achieved in various conventional ways from the related art.

In this way, no on-chain interaction, and in particular no cross-shard transaction, is required, as long as all involved parties agree and an arbitration proceeding is not required.

Within the convention possibilities for multiple nested, stacked (virtual) channels, flexible and powerful networks can be built for an efficient transfer across the shards, as is standard in a shard-based system. For example, nodes can be provided on many, or even all, shards, and indirect connections (multi-hop) can be provided over a plurality of medium-large nodes up to simple multi-hop connections between nodes of equal rank (peer to peer).

The initial outlay for the provision (11) of the auxiliary contracts required for the anchoring (12), and for the application of the on-chain channels to the shards, is rapidly amortized by the drastically reduced costs for the carrying out (13) of cross-shard transactions.

In order to illustrate the difference from conventional solutions, it is to be noted that according to the related art all users and intermediaries, or hubs, would have to be active on the same shard. This would enable at best a reduction in the on-chain costs for transactions within this shard.

In contrast, the present approach permits the efficient bridging of shards on the basis of safe constructs, such as are used in trust-free channels.

In a second approach in accordance with the present invention, the distributed system, which operates the shards and automatically adds further shards if necessary for the runtime, could provide the auxiliary contracts for the anchoring of the state channel in the context of the setting up of a new shard (11), so that the on-chain channels can be opened and used to carry out (13) the off-chain transactions for new shards as well without having to actively provide the auxiliary contracts.

According to a third approach in accordance with the present invention, the auxiliary contracts for anchoring (12) the state channels are not provided individually for each shard, but rather are provided (11) together for all shards, in the form of a generally usable functionality.

This in turn makes it possible to apply on-chain channels for anchoring (12), and to carry out (13) the off-chain transactions for new shards as well without having to actively provide the auxiliary contracts.

As described above, the intermediary or node function can be taken on by any user that is active on more than one shard. In addition, the distributed system could itself offer corresponding possibilities.

Figure 2:
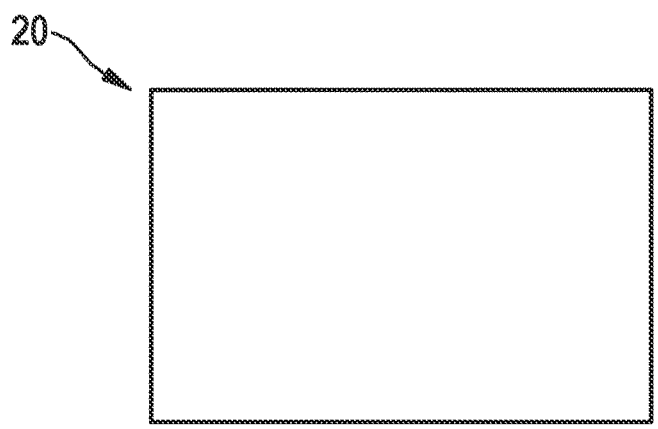
FIG. 2 schematically shows a control device according to a second specific example embodiment of the present invention.

This method (10) can be implemented for example in software or hardware, or in a mixed form of software and hardware, for example in a control device (20), as is shown by the schematic representation in FIG. 2.

What is claimed is:

1. A method for conducting a transaction between a first user on a first partition of a blockchain and a second user on a second partition of the blockchain, the method comprising the following steps:
   providing, on the first partition, a first smart contract, and, on the second partition, a second smart contract, wherein the first partition stores a first set of transactions, the second partition stores a second set of transactions, and the first set of transactions and the second set of transactions are independent from each other;
   anchoring state channels in the first and second partitions through the first and second smart contracts, wherein the first smart contract implements a first state channel between the first user and an intermediary on the first partition, and the second smart contract implements a second state channel between the second user and the intermediary on the second partition; and
   carrying out the transaction between the first and second partitions on the state channels, wherein the transaction includes the intermediary receiving a value from the first user on the first partition using the first state channel implemented by the first smart contract, and the intermediary communicating the value to the second user on the second partition using the second state channel implemented by the second smart contract.

2. The method as recited in claim 1, wherein the intermediary is a node networked with further intermediaries in the blockchain.

3. The method as recited in claim 2, wherein the intermediaries are connected indirectly via a number of partitions.

4. The method as recited in claim 1, wherein the partitions are operated by a system distributed in the blockchain, and the providing step takes place through the system.

5. The method as recited in claim 4, wherein the providing step takes place when the system sets up the first and second partitions of the blockchain.

6. A non-transitory machine-readable storage medium on which is stored a computer program, which when executed by a computer, causes the computer to perform a method for conducting a transaction between a first user on a first partition of a blockchain and a second user on a second partition of the blockchain, the method comprising the following steps:

provide, on the first partition, a first smart contract, and, on the second partition, a second smart contract, wherein the first partition stores a first set of transactions, the second partition stores a second set of transactions, and the first set of transactions and the second set of transactions are independent from each other;

anchoring state channels in the first and second partitions through the first and second smart contracts, wherein the first smart contract implements a first state channel between the first user and an intermediary on the first partition, and the second smart contract implements a second state channel between the second user and the intermediary on the second partition; and carrying out the transaction between the first and second partitions on the state channels, wherein the transaction includes the intermediary receiving a value from the first user on the first partition using the first state channel implemented by the first smart contract, and the intermediary communicating the value to the second user on the second partition using the second state channel implemented by the second smart contract.

7. A device configured to conduct a transaction between a first user on a first partition of a blockchain and a second user on a second partition of the blockchain, the device configured to:

provide, on the first partition, a first smart contract, and, on the second partition, a second smart contract, wherein the first partition stores a first set of transactions, the second partition stores a second set of transactions, and the first set of transactions and the second set of transactions are independent from each other;

anchor state channels in the first and second partitions through the first and second smart contracts, wherein the first smart contract implements a first state channel between the first user and an intermediary on the first partition, and the second smart contract implements a second state channel between the second user and the intermediary on the second partition; and carry out the transaction between the first and second partitions on the state channels, wherein the transaction includes the intermediary receiving a value from the first user on the first partition using the first state channel implemented by the first smart contract, and the intermediary communicating the value to the second user on the second partition using the second state channel implemented by the second smart contract.

\* \* \* \* \*